United States Patent
Chen et al.

(10) Patent No.: US 10,287,447 B2
(45) Date of Patent: May 14, 2019

(54) RADIATION CURABLE BINDER DISPERSION FOR AN INKJET INK

(71) Applicant: Hewlett-Packard Development Company, L.P., Houston, TX (US)

(72) Inventors: Tienteh Chen, San Diego, CA (US); Bin Huang, San Diego, CA (US); Gregg A. Lane, San Diego, CA (US)

(73) Assignee: Hewiett-Packard Development Company, L.P., Spring, TX (US)

( * ) Notice: Subject to any disclaimer, the term of this patent is extended or adjusted under 35 U.S.C. 154(b) by 42 days.

(21) Appl. No.: 15/518,475

(22) PCT Filed: Oct. 31, 2014

(86) PCT No.: PCT/US2014/063334
§ 371 (c)(1),
(2) Date: Apr. 11, 2017

(87) PCT Pub. No.: WO2016/068983
PCT Pub. Date: May 6, 2016

(65) Prior Publication Data
US 2017/0226360 A1  Aug. 10, 2017

(51) Int. Cl.
C09D 11/10 (2014.01)
C09D 11/322 (2014.01)
C09D 11/101 (2014.01)

(52) U.S. Cl.
CPC .......... *C09D 11/322* (2013.01); *C09D 11/101* (2013.01)

(58) Field of Classification Search
CPC ..... C09D 11/322; C09D 11/101; C09D 11/10; C08G 18/0804; C08G 18/0823; C08G 18/0819; C08G 18/0828
See application file for complete search history.

(56) References Cited

U.S. PATENT DOCUMENTS

| | | | |
|---|---|---|---|
| 5,548,005 A | 8/1996 | Kurth et al. | |
| 5,900,457 A | 5/1999 | Duan et al. | |
| 5,990,192 A | 11/1999 | Gerlitz et al. | |
| 6,011,078 A | 1/2000 | Reich et al. | |
| 6,207,744 B1 | 3/2001 | Paulus et al. | |
| 6,635,706 B1 | 10/2003 | Petschke et al. | |
| 6,803,112 B1 | 10/2004 | Chatterjee et al. | |
| 8,048,937 B2 | 11/2011 | Heischkel et al. | |
| 8,231,976 B2 | 7/2012 | Sommer et al. | |
| 8,722,762 B2 | 5/2014 | Peleshanko | |
| 10,131,814 B2 * | 11/2018 | Berger | C09D 175/16 |
| 2002/0198289 A1 | 12/2002 | Gummeson | |
| 2004/0242763 A1 | 12/2004 | Tielemans et al. | |
| 2006/0094819 A1 | 5/2006 | Muller et al. | |
| 2009/0270581 A1 | 10/2009 | Tielemans et al. | |
| 2010/0222448 A1 | 9/2010 | Ziegler et al. | |
| 2011/0017085 A1 | 1/2011 | Seecharan et al. | |
| 2011/0052903 A1 | 3/2011 | Van Oorschot et al. | |
| 2011/0059262 A1 | 3/2011 | Lockhart et al. | |
| 2013/0085217 A1 | 4/2013 | Iu et al. | |
| 2013/0196124 A1 | 8/2013 | Flores et al. | |
| 2013/0310513 A1 | 11/2013 | Salviato et al. | |
| 2013/0316098 A1 | 11/2013 | Lubnin et al. | |
| 2014/0128533 A1 | 5/2014 | Vanmeulder et al. | |
| 2016/0200938 A1 * | 7/2016 | Berger | C09D 175/16 428/423.4 |

FOREIGN PATENT DOCUMENTS

| | | |
|---|---|---|
| CN | 102977684 | 3/2013 |
| EP | 1571184 | 9/2005 |
| EP | 2657308 | 10/2013 |
| WO | WO-2007043544 | 4/2007 |
| WO | WO-2009115489 | 9/2009 |
| WO | WO-2013034880 | 3/2013 |
| WO | WO-2013083956 | 6/2013 |
| WO | WO-2014033657 | 3/2014 |
| WO | WO-2014078483 | 5/2014 |

OTHER PUBLICATIONS

International Search Report and Written Opinion for International Application No. PCT/US2014/063334 dated Jun. 30, 2015, 12 pages.

* cited by examiner

*Primary Examiner* — Sanza L. McClendon
(74) *Attorney, Agent, or Firm* — Dierker & Kavanaugh PC

(57) ABSTRACT

An example of a radiation curable binder dispersion for an inkjet ink includes water and a radiation curable polyurethane dispersed in the water. The radiation curable polyurethane has a weight average molecular weight that is equal to or less than 5,000, a glass transition temperature ($T_g$) less than 25° C., and a double bond density higher than 4.0. The radiation curable polyurethane binder dispersion is formed from a non-aromatic diisocyanate; a polyol; an acrylate or methacrylate, the acrylate or methacrylate having at least two hydroxyl functional groups and having an acrylate functional group or a methacrylate functional group; a compound including i) an ionic group or ii) a group to form an ionic group; and another acrylate or methacrylate, the other acrylate or methacrylate having a hydroxyl functional group or an amino functional group.

16 Claims, No Drawings

RADIATION CURABLE BINDER DISPERSION FOR AN INKJET INK

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

DETAILED DESCRIPTION

In inkjet printing, polyurethane dispersions may be added to inkjet inks to improve the durability of the resulting print. In particular, radiation curable polyurethanes have been added to improve the scratch and abrasion resistance of the resulting prints. However, it has been found that the amount and type of polyurethane used in the inkjet inks may lead to complications with the jetting performance and reliability (e.g., nozzle health).

These complications may include poor decap performance of the ink (which includes the polyurethane). The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. A decreased decap time can lead to poor print reliability. As such, the longest decap time that would give acceptable first drop quality or the fewest number of spits required at any given decap time would be desirable for any given ink.

Examples of the inkjet ink disclosed herein, which include the radiation curable polyurethane binder dispersion disclosed herein, exhibit several desirable characteristics, one of which is improved decap performance. In particular, when the inkjet ink is printed at intervals with idle and uncapped periods between printing intervals, the number of spits (drops) required to obtain a healthy (i.e., drop weight and location) normal drop on a medium is reduced, e.g., when compared to inks including other types of polyurethane dispersions.

The improved decap performance is believed to be due, at least in part, to the particular isocyanate used to form the polyurethane binder as well as the low weight average molecular weight (i.e., 5,000) of the polyurethane binder. The improved decap performance may also be due to the relatively small size of the polyurethane binder. For example, the polyurethane binder may be in the form of particles having an average diameter ranging from about 20 nm to about 200 nm. These small particles can be easily jetted, and thus do not deleteriously affect the nozzle health. Still further, the improved decap performance may be due, at least in part, to other properties of the radiation curable polyurethane binder dispersion, including the glass transition temperature ($T_g$), the double bond density (i.e., milliequivalents ($10^{-3}$ equivalent) of double bonds per 1 gram of dry polymer), and the acid number (e.g., mg KOH per 1 gram of polymer). These properties may also contribute to the inkjet ink having dispersion stability, faster curing speed, and the ability to form durable prints. Overall, the inkjet inks including examples of the radiation curable polyurethane binder dispersion disclosed herein exhibit improved jetting performance and print reliability.

The radiation curable inkjet ink, which includes the radiation curable polyurethane binder disclosed herein, may be included in a single cartridge ink set or a multiple-cartridge ink set. In the multiple-cartridge ink set, any number of the multiple inks may have the radiation curable polyurethane binder incorporated therein. As used herein, the terms "ink(s)" and "ink composition" refer to the radiation curable, inkjet ink.

In an example, the inkjet ink disclosed herein includes a co-solvent, a colorant, a surfactant, an anti-kogation agent, a photoinitiator, the radiation curable polyurethane binder, and a balance of water. In some examples, the inkjet ink composition consists of these components, with no other components. As one example, the inkjet ink may exclude polymers other than the radiation curable polyurethane binder disclosed herein.

As used herein, "ink vehicle" may refer to the liquid fluid in which the radiation curable polyurethane binder (e.g., the radiation curable polyurethane binder dispersion) and the colorant (e.g., a colorant dispersion) are placed to form the ink(s). A wide variety of ink vehicles may be used in the inkjet ink. The ink vehicle may include water alone or in combination with a mixture of a variety of additional components. Examples of these additional components may include the co-solvent(s), the surfactant(s), and the anti-kogation agent(s).

The co-solvent(s) may be present in the inkjet ink in an amount ranging from about 0.1 wt % to about 30 wt %, depending, at least in part, on the jetting architecture. In an example, the co-solvent is present in the inkjet ink in an amount of about 10 wt % based on the total wt % of the inkjet ink. It is to be understood that other amounts outside of this example and range may also be used. Classes of co-solvents that may be used include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

As mentioned above, the ink vehicle of the inkjet ink may also include surfactant(s). As an example, the inkjet ink may include non-ionic, cationic, and/or anionic surfactants, which may be present in an amount ranging from about 0.01 wt % to about 5 wt % based on the total wt % of the inkjet ink. In at least some examples, the ink vehicle may include a silicone-free alkoxylated alcohol surfactant such as, for example, TECO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), SURFYNOL® CT 211 (non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL™ TMN-3 and TERGITOL™ TMN-6 (both of which are branched secondary alcohol ethoxylate, non-ionic surfactants), and TERGITOL™ 15-S-3, TERGITOL™ 15-S-5, and TERGITOL™ 15-S-7 (each of which is a secondary alcohol ethoxylate, non-ionic surfactant) (all of the TERGITOL™ surfactants are available from The Dow Chemical Co.).

The ink vehicle of the inkjet ink may include the anti-kogation agent. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid from Croda Int.) or dextran 500 k. Other suitable examples of the anti-kogation agents include CRODAFOS™ HCE (phosphate-ester from Croda Int.), CRODAFOS™ N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the inkjet ink in an amount ranging from about 0.05 wt % to about 2 wt % of the total wt % of the ink.

In some examples disclosed herein, the ink vehicle of the inkjet ink may also include antimicrobial agent(s) (biocide(s)), viscosity modifier(s), material(s) for pH adjustment, sequestering agent(s), preservative(s), jettability additive(s) (e.g., liponic ethylene glycol (LEG-1), available from Liponics), and the like.

When a biocide is utilized, a suitable amount of the biocide may range from about 0.05 wt % to about 0.5 wt % of a total wt % of the ink. In examples, the biocide is present at about 0.18 wt %, or at about 0.14 wt % of a total wt % of the ink. It is to be understood that the upper limit for the biocide(s) may depend upon the type of biocide and its toxicological effect and/or regulatory requirements. For example, the upper limit for PROXEL™ GXL (Arch Chemicals, Inc., Norwalk, Conn.) is 0.2 wt %. Suitable biocides include, for example, PROXEL™ GXL, KORDEK™ MLX (The Dow Chemical Co.), and/or BIOBAN™ CS-1246 (The Dow Chemical Co.).

The inkjet ink may also include a photoinitiator. The photoinitiator initiates the polymerization and/or crosslinking of the radiation curable polyurethane upon exposure to a suitable stimulus (e.g., electromagnetic radiation). Some examples of the photoinitiator include 1-[4-(2-Hydroxyethoxy)-phenyl]-2-hydroxy-2-methyl-1-propane-1-one (which is commercially available from BASF Corp. as IRGACURE® 2959); acyl phosphine oxide photoinitiators (e.g., IRGACURE® 819, commercially available from BASF Corp.); alpha hydroxy ketone photoinitiators (e.g., IRGACURE® 184, commercially available from BASF Corp.); Iodonium, (4-methylphenyl)[4-(2-methylpropyl) phenyl]-,hexafluorophosphate(1-) (which is commercially available from BASF Corp. as IRGACURE® 250); a high-molecular-weight sulfonium salt (e.g., IRGACURE® 270, commercially available from BASF Corp.); 2-Benzyl-2-dimethylamino-1-(4-morpholinophenyl)-butanone-1 (which is commercially available from BASF Corp. as IRGACURE® 369); alpha amino ketone photoinitiator (e.g., IRGACURE® 379, commercially available from BASF Corp.); a liquid blend of alpha hydroxy ketone/benzophenone photoinitiator (e.g., IRGACURE® 500, commercially available from BASF Corp.); and a liquid photoinitiator blend of acyl phosphine oxide/alpha hydroxy ketone (e.g., IRGACURE® 2022, commercially available from BASF Corp.). Some other suitable photoinitiators include phosphine oxide derivatives, thioxanthone derivatives, and benzophenone derivatives. The photoinitiator is present in the inkjet ink in an amount ranging from about 0.1 wt % to about 1.0 wt. % of the total wt % of the ink. In another example, the photoinitaitor is present in the in the inkjet ink in an amount ranging from about 0.2 wt % to about 0.6 wt. % of the total wt % of the ink.

The inkjet ink may be any color, such as black, cyan, magenta, yellow, etc. As such, in addition to the ink vehicle, the inkjet ink also includes a colorant. In an example, the colorant is a self-dispersed pigment added to the ink vehicle. In another example, the colorant is a pigment in a dispersion including water, the pigment, and a polymer that disperses the pigment (i.e., the polymer dispersant). In an example, the pigment dispersion may also include, for example, a co-solvent, such as 2-pyrrolidone. The pigment dispersion may be prepared or purchased, and the other components of the ink (e.g., vehicle components and the radiation curable polyurethane binder dispersion) may be slowly added to the pigment dispersion with continuous mixing, to form the inkjet ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof. Any suitable pigment may be used, and while several examples are provided herein, it is to be understood that the list is non-limiting.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

The total amount of pigment in the inkjet ink ranges from about 1 wt % to about 5 wt % (based on the total wt % of the inkjet ink). The average particle size of the pigments may range anywhere from about 50 nm to about 200 nm. In an example, the average particle size ranges from about 80 nm to about 150 nm.

In the examples disclosed herein, the pigment may be dispersed by an anionic polymer (i.e., anionic polymeric dispersant). The dispersant may be present in an amount ranging from about 0.1 wt % to about 5 wt % of a total wt % of the ink composition.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water soluble.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

The inkjet ink also includes the radiation curable polyurethane binder. In an example, the radiation curable polyurethane binder is present in the radiation curable polyurethane binder dispersion with water. The radiation curable polyurethane/radiation curable polyurethane binder is present in the ink an amount ranging from about 5 wt % to about 20 wt % based upon the total wt % of the inkjet ink. In another example, the amount of radiation curable polyurethane/radiation curable polyurethane binder ranges from about 5 wt % to about 10 wt % or from about 5 wt % to about 15 wt % based upon the total wt % of the inkjet ink. This weight percentage accounts for the polyurethane/polyurethane binder itself, and does not account for any other components (e.g., water) that may be present when the polyurethane is part of the dispersion. The radiation curable polyurethane binder dispersion may be added with the colorant (e.g., colorant dispersion) and the components of the ink vehicle to form the inkjet ink.

The radiation curable polyurethane binder dispersion may be formed by synthesizing a polyurethane solution (i.e., the polyurethane polymer in an organic solvent), and then ionizing and dispersing the polyurethane solution in water to form the radiation curable polyurethane binder dispersion. The resulting radiation curable polyurethane binder dispersion includes the polyurethane polymer, which is water soluble/dispersible. Each of these steps will be discussed further below.

The radiation curable polyurethane binder is formed from the following components: (a) a hexamethylene diisocyanate (b) a polyol, (c) an acrylate or methacrylate with at least two hydroxyl functional groups, (d) a compound including an ionic group or a group capable of forming an ionic group, and (e) another acrylate or methacrylate, the other acrylate or methacrylate having a hydroxyl functional group or an amino functional group. These components are selected so that the resulting radiation curable polyurethane binder has a weight average molecular weight ($M_w$) equal to or less than 5,000, a glass transition temperature ($T_g$) less than 25° C., a double bond density higher than 4.0, and an acid number ranging from 5 to 30. The combination of these particular components and properties are believed to improve the decap performance of the inkjet ink.

In addition, the radiation curable polyurethane binder disclosed herein may have a ratio of isocyanate groups (NCO) to hydroxyl groups (OH) (i.e., NCO:OH ratio) that is greater than 1.8. In another example, the NCO:OH ratio of the radiation curable polyurethane binder is equal to or greater than 2.1. In yet another example, the NCO:OH ratio ranges from about 2.6 to about 2.8. In this NCO:OH ratio, it is to be understood that the number of hydroxyl groups (OH) making up the OH portion of the ratio is not the total number of hydroxyl groups in the polyurethane binder, but rather is determined from the hydroxyl groups of component (b) (polyol), component (c) (acrylate or methacrylate with at least two hydroxyl functional groups), and component (d) (the compound including an ionic group or a group to form an ionic group). As such, the total number of OH groups for the NCO:OH ratio is not based on hydroxyl groups from component (e). While not accounted for in this NCO:OH ratio, it is to be understood that the total number of hydroxyl groups (OH) in the polyurethane binder also includes any hydroxyl groups from component (e). It is believed that when the ratio of isocyanate groups (NCO) to hydroxyl groups (OH) is greater than 1.8, the decap performance may be even further improved.

For component (a), any non-aromatic diisocyanate may be used. In an example, the non-aromatic diisocyanate may be hexamethylene-1,6-diisocyanate (HDI), 2,2,4-trimethyl-hexamethylene-diisocyanate, or a combination thereof. The polyurethane excludes any other isocyanate. The amount of the non-aromatic diisocyanate within the radiation curable binder dispersion ranges from about 20 wt % to about 50 wt % of the total wt % of the radiation curable polyurethane. In an example, hexamethylene diisocyanate makes up from about 30 wt % to about 50 wt % of the polyurethane binder.

Turning to component (b), the amount of component (b) (i.e., the polyol) within the radiation curable polyurethane binder dispersion ranges from about 10 wt % to about 30 wt % of the total wt % of the radiation curable polyurethane. In an example, component (b) (i.e., the polyol) makes up from about 15 wt % to about 25 wt % of the polyurethane binder.

Component (b) is a polyol. The term "polyol", as used herein, means any product having an average of about 2 or more hydroxyl groups per molecule. Some examples of suitable polyols for component (b) may be part of a first class of polyols. As examples, the first class of polyols has a number average molecular weight ranging from greater than 500 to about 5,000. In any of these examples, component (b) is a macro-glycol. Examples of suitable polyols of the first class include polyester polyols, polyether polyols, polycarbonate polyols, poly(ethyleneoxide) polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols, hydrogenated polybutadiene polyols, polyisobutylene polyols, polyacrylate polyols, halogenated polyesters and polyethers, or mixtures thereof. In an example, the polyol is poly(propyleneglycol), poly(tetrahydrofuran), poly(ethyleneoxide), a polycarbonate polyol, or a polyester polyol.

Other examples of suitable polyols for component (b) may be part of a second class of polyols. The second class has a number average molecular weight that is 500 or lower. Examples of suitable polyols of the second class include 1,2-propanediol, 1,3-propanediol, 1,2-butanediol, 1,3-butanediol, 1,4-butanediol, 1,5-pentanediol, 3-methylpentane-1,5-diol, 1,6-hexanediol, neopentylglycol, cyclohexane-1,4-dimethanol, 1,2-cyclohexanediol, 1,4-cyclohexanediol, 2-ethyl-3-propylpentanediol, 2,4-dimethylpentanediol, 2-ethyl-2-butylpropanediol, diethyleneglycol, triethyleneglycol, tetraethyleneglycol, dipropyleneglycol, tripropyleneglycol, N-substituted ethanolamines, and mixtures thereof. In an example, the polyol is selected from 1,4-butanediol, 1,5-pentanediol, 3-methylpentane-1,5-diol, 1,6-hexanediol, neopentylglycol, and cyclohexane-1,4-dimethanol, trimethylolpropane, glycerol, or pentaerythritol.

It is to be understood that a combination of any of the listed polyols may be used.

The radiation curable polyurethane binder dispersion may further include component (c). Component (c) includes an acrylate or methacrylate with at least two hydroxyl functional groups. In this example, the acrylate or methacrylate with at least two hydroxyl functional groups is present in an amount ranging from greater than 0 wt % to about 40 wt % based on the total wt % of the radiation curable polyurethane.

Some examples of the acrylate or methacrylate with at least two hydroxyl functional groups include those obtained from the reaction of diglycidyl compounds with (meth) acrylic acid. Aliphatic diglycidyl compounds derived from alpha, omega diols having 4 to 12 carbon atoms or from polyoxyalkylenediols (such as polyethylene glycol, polypropylene glycol, or mixtures thereof that contain oxyalkylene groups) may be used. Some specific examples include 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, hydrogenated bisphenol A diglycidyl ether (BGDA or BADGE), hydrogenated bisphenol F diglycidyl ether, and their ethoxylated and/or propoxylated equivalents. An additional example is 1,6-hexanediylbis [oxy(2-hydroxy-3,1-propanediyl)] bisacrylate. Some commercially available examples include MIRAMAR™ PE-210 and MIRAMAR™ PE-230 (Miwon Chemical).

In further examples, the acrylate or methacrylate with at least two hydroxyl functional groups includes aromatic diglycidyl compounds derived from bisphenol A and bisphenol F. Specifically, bisphenol A diglycidyl ether, bisphenol F diglycidyl ether and their ethoxylated and/or propoxylated equivalents may be used. Diglycidyl esters may also be used, such as diglycidyl phthalate, N,N-diglycidyl aniline, or N,N-diglycidyl-4-glycidyloxyaniline. Some specific examples include a diacrylate ester of bisphenol A diglycidyl ether (BGDA) and a dimethacrylate ester of bisphenol A diglycidyl ether (BGDM).

Component (d) is a compound including an ionic group or a group that is capable of forming an ionic group. The amount of component (d) within the radiation curable binder dispersion ranges from greater than 0 wt % to about 10 wt % based upon the total wt % of the radiation curable polyurethane. In an example, component (d) makes up from about 2 wt % to about 6 wt % of the polyurethane binder.

The presence of component (d) assists in the ability of the polyurethane to be dissolved or dispersed in water after ionization with a base. Examples of component (d) may be derived from hydroxy-carboxylic acids having the general formula $(HO)_x Q(COOH)_y$, where Q is a straight or branched hydrocarbon radical containing 1 to 12 carbon atoms, and x and y each independently range from 1 to 3. Examples of suitable hydroxy-carboxylic acids include dimethylol propionic acid (DMPA), dimethylol butanoic acid (DMBA), citric acid, tartaric acid, glycolic acid, lactic acid, malic acid, dihydroxymaleic acid, dihydroxytartaric acid, or mixtures thereof. Hydroxyls or amines containing a sulfonate functional group can also be used as component (d). Examples include taurine and aminoethylaminopropylsulfonate (EPS). Hydroxyls or amines containing a phosphate functional group can also be used as component (d). An example includes glycerol phosphate disodium dehydrate.

Turning now to component (e), component (e) is an acrylate or methacrylate having a hydroxyl functional group or an amino functional group. Component (e) renders the polyurethane curable via ultraviolet light or some other suitable electromagnetic radiation.

The amount of component (e) in the radiation curable polyurethane binder dispersion ranges from greater than 10 wt % to about 65 wt % based upon the total wt % of the radiation curable polyurethane. In an example, component (e) makes up from about 20 wt % to about 50 wt % of the polyurethane binder.

Some examples of component (e) include the esterification products of aliphatic and/or aromatic polyols with acrylic acid or methacrylic acid. These products have a residual OH functionality of about 1. Some of these products also have at least two acrylic functionalities. Examples of component (e) include the partial esterification products of acrylic acid or methacrylic acid with tri-, tetra-, penta- or hexahydric polyols or mixtures thereof. These modified or unmodified polyols are partly esterified with acrylic acid, methacrylic acid or mixtures thereof until the desired residual hydroxyl functionality is reached. Suitable examples include acrylic or the methacrylic esters with linear and branched polyols in which the at least one hydroxyl functionality remains free, such as hydroxyalkylacrylates or hydroxyalkylmethacrylates having 1 to 20 carbon atoms in the alkyl group. Some specific examples include hydroxyethylacrylate (HEA), hydroxyethylmethacrylate (HEMA), hydroxybutylacrylate (HBA), hydroxybutylmethacrylate (HBMA), (3-(acryloxy)-2-hydroxypropyl methacrylate) (AHPMA), glycerol diacrylate, trimethylolpropane diacrylate, pentaerythritoltriacrylate (PETA), ditrimethylolpropane triacrylate (DTPTA), dipentaerythritol pentaacrylate (DPPA), and (poly)ethoxylated and/or (poly) propoxylated equivalents of glycerol diacrylate, trimethylolpropane diacrylate, PETA, DTPTA, or DPPA.

In an example of the first step of the method for making the radiation curable polyurethane binder dispersion, components (a), (b), (c) and (d) are mixed in a reactor with the organic solvent (e.g., dibutyl tin dilaulate, acetone, or combinations thereof). The reactor may be maintained at a constant temperature and under a dry air mixture. The components may be mixed and the polymerization reaction may be allowed to occur for some desirable time (e.g., 1 hour to 4 hours).

In an example of the second step of the method for making the polyurethane polymer, component (e) is then added to the polymerization reaction of components (a), (b), (c) and (d), and polymerization is continued for some desirable time to form the polyurethane solution.

In an example of the third step of the method for making the polyurethane polymer, the polyurethane solution may be added to water including a base slowly (e.g., over a 10 minute period) with agitation or vice versa. The mixture may be stirred and organic solvent may be removed to form the polyurethane binder dispersion. In an example, the acid number of the polyurethane binder dispersion ranges from about 5 mg KOH/g solid resin to about 30 mg KOH/g solid resin, or from about 5 mg KOH/g solid resin to less than 25 mg KOH/g solid resin, or from about 10 mg KOH/g solid resin to less than 20 mg KOH/g solid resin. In other examples, the acid number of the polyurethane binder dispersion ranges from about 5 mg KOH/g solid resin to about 40 mg KOH/g solid resin, or from about 10 mg KOH/g solid resin to less than 30 mg KOH/g solid resin.

Once the radiation curable polyurethane binder dispersion is prepared, the particle size of the radiation curable polyurethane binder in the dispersion ranges from about 20 nm to about 200 nm. In an example, the particle size of the radiation curable polyurethane binder ranges from about 20 nm to about 100 nm. The double bond density the radiation curable polyurethane binder is greater than 4.0 meq/g. In an example, the double bond density ranges from greater than 4.0 meq/g to about 6.0 meq/g. The glass transition temperature ($T_g$) of the radiation curable polyurethane binder is less than 25° C. This provides the inkjet ink with a tacky consistency (prior to curing) when applied to a medium.

After the ink is prepared, the ink(s) may be applied to a medium using any inkjet printer (e.g., thermal, piezoelectric, etc.). The medium may be coated or uncoated paper. The medium may also be a vinyl or plastic material.

The ink may then be exposed to curing. Any suitable source of UV radiation may be used to initiate curing, such as, for example, UV lamps, LED (light emitting diode) lamps, LEP (light emitting plasma) plasma torches, or lasers operating in the UV range. Electron beam curing may also be used. The actual wavelength (within the UV range of 280 nm to 400 nm) and intensity of the ultraviolet radiation used may vary, depending at least in part, upon the curable polymer components (e.g., the polyurethane binder) included in the ink. Once the ink is cured, a film forms on the medium.

To further illustrate the present disclosure, examples are given herein. It is to be understood that these examples are provided for illustrative purposes and are not to be construed as limiting the scope of the present disclosure.

EXAMPLES

Example 1

Several examples of the radiation curable polyurethane binder dispersion disclosed herein and several comparative polyurethane dispersion examples were prepared. The compositions are shown in Table 1, with the wt % of each component that was used. Several properties of the resulting polyurethane binder dispersions are also provided in Table 1. Each of the comparative polyurethane dispersion examples had a weight average molecular weight greater than 5,000.

PUD-392 was synthesized as follows:

(Part 1) 28.4 g of Poly(tetrahydrofuran) polyol (MW=1K), 10.7 g of BGDA, 5.50 g of DMPA, 0.11 g of monomethyl ether of Hydroquinone (MEHQ), 41.0 g of HDI, and 36 ml of acetone were mixed in a 500 ml 4-neck round bottom flask. The NCO/OH ratio was 2.60. A mechanical stirrer and condenser were attached. The flask was immersed in a constant temperature bath at 70° C. The reactor system was maintained under dry air blanket. 5 drops of dibutyl dilaurate (DBTDL) were added to initiate the polymerization. Polymerization was continued for 2 hours at 70° C. 0.5 g samples were withdrawn for % NCO titration. % NCO was 15.0%.

(Part 2) 64.1 g of AHPMA, 0.64 g of MEHQ, and 17 g of acetone were mixed in a beaker and added to the reactor system over 30 seconds. 10 g of acetone was used to rinse off the residual monomers on the beaker and was added to the reactor system. The polymerization was continued for three more hours at 70° C. 0.5 g of prepolymer was withdrawn for final % NCO titration. % NCO was 0.2%.

(Part 3) The water bath temperature was reduced to 50° C. for 15 minutes. 4.4 g of triethanolamine (TEA) was added to the prepolymer and mixed for 10 minutes. The prepolymer solution was added to 318 g of deionized water over 5 minutes with enough agitation to form a polyurethane dispersion (PUD). The agitation was continued for 15 minutes. The PUD was filtered through 400 mesh stainless sieve. Acetone was removed with a Rotovap at 55° C. The final PUD was filtered through fiber glass filter paper.

The particle size of the polyurethane in PUD-392 was measured by Malvern Zetasizer and was 50 nm. The pH was 8.1. % Solid was 33.0%.

Each of the other example and comparative example polyurethane dispersions were prepared in a similar manner to PUD-392, using the components and amounts set forth in Table 1.

The following abbreviations are used in Table 1: AN (acid number), DB (double bond density), $MW_w$ (weight average molecular weight), HDI (Hexamethylene-1,6-diisocyanate), PPG (Polypropyleneglycol, $MW_w$ 1000), PTMG (Polytetrahydrofuran, $MW_w$ 1000), YMER N-120 (Polyethyleneoxide Diol from Perstop Chemical), BGDA (Bisphenol A diglycidylether), DMPA (2,2'-Dimethylol Propionic Acid), AHPMA (3-(acryloxy)-2-hydroxypropyl methacrylate), and PETA (Pentaerythritoltriacrylate).

TABLE 1

| PUD- | | | | NCO:OH | (a) | (b) | | | (c) | (d) | (e) | |
|---|---|---|---|---|---|---|---|---|---|---|---|---|
| ID | AN | DB | $MW_w$ | Ratio** | HDI | PPG | PTMG | N-120 | BGDA | DMPA | AHPMA | PETA |
| 392 | 15.1 | 4.2 | 5,000 | 2.6 | 27 | none | 18.7 | 1.50 | 7.06 | 3.6 | 42.2 | none |
| 379 | 16.7 | 4.3 | 4,500 | 2.6 | 27.5 | 15.6 | none | 2.50 | 7.22 | 4.0 | 43.1 | none |
| 389 | 16.7 | 4.3 | 4,900 | 2.6 | 27.5 | none | 16.3 | 2.00 | 7.22 | 4.0 | 42.9 | none |
| 380 | 16 | 4.3 | 4,400 | 2.6 | 27.1 | 13.9 | none | 5.00 | 7.1 | 3.8 | 65.4 | none |
| 375 | 21.2 | 4.5 | 4,300 | 2.6 | 29 | 11 | none | 2.00 | 7.6 | 5.0 | none | 45.3 |
| 377 | 20.8 | 4.5 | 4,500 | 2.6 | 29.2 | 13.4 | none | none | 7.66 | 5.0 | 44.7 | none |
| 382 | 16.9 | 4.6 | 4,600 | 2.8 | 28.7 | 13.9 | none | none | 7.88 | 4.0 | 45.5 | none |
| 390 | 21.1 | 4.6 | 4,400 | 2.6 | 29 | none | 9.1 | 3.50 | 7.6 | 5.0 | 45.7 | none |
| 381 | 16.7 | 4.4 | 4,200 | 2.6 | 27.5 | 14.9 | none | 2.50 | 7.56 | 4.0 | 43.6 | none |
| 396 | 16.1 | 4.6 | 4,200 | 2.8 | 27.9 | none | 9.8 | 5.00 | 7.67 | 3.8 | 45.8 | none |
| 395 | 20.9 | 4.8 | 4,400 | 2.8 | 30 | none | 9.23 | none | 8.24 | 5.0 | 47.5 | none |
| 369* | 8.6 | 4.8 | 19,000 | 1.2 | 21.1 | 19.3 | none | 6.00 | 5.52 | 2.0 | none | 45.8 |
| 365* | 8.4 | 5.4 | 9,700 | 1.6 | 21.6 | none | 13.9 | 6.00 | 5.2 | 2.0 | none | 51.2 |
| 364* | 14.9 | 5.5 | 8,100 | 1.8 | 23.2 | 12.1 | none | 3.00 | 5.35 | 3.5 | none | 52.7 |
| 368* | 21.4 | 5.6 | 7,300 | 1.8 | 24.8 | none | 4.92 | 6.00 | 5.96 | 5.0 | none | 53.2 |
| 371* | 14.6 | 5.4 | 11,000 | 1.6 | 23.4 | none | none | 3.00 | 5.61 | 3.5 | none | 51.8 |
| 370* | 21 | 6.1 | 8,800 | 1.8 | 26 | none | 5.15 | none | 6.24 | 5.0 | none | 57.6 |

*Comparative Radiation Curable Polyurethane Binder
**OH of NCO:OH ratio based on OH groups from components b, c, and d, not component e

Example 2

In this example, example and comparative ink compositions were prepared with a cyan pigment (present in a dispersion with water) and the example and comparative radiation curable polyurethane binder dispersions listed in Table 1. The formulations of each of the example and comparative ink compositions are shown in Table 2. The inks were prepared by adding the respective radiation curable binder dispersion and the cyan pigment dispersion to the remaining ink components shown in Table 2.

TABLE 2

| Ingredient | Specific component | wt % active |
|---|---|---|
| PUD | Radiation curable polyurethane binder dispersion of TABLE 1 | 5.00 |
| Co-solvent | 1-(2-hydroxyethyl)-2-pyrrolidone | 10.00 |
| Kogation agent | CRODAFOS ® N3A | 0.75 |
| Surfactant | SURYNOL-SEF ® (80%) | 0.40 |
| Surfactant | TEGOWET ® 510 | 0.40 |
| Additive | LEG-1 | 1.00 |
| Photoinitiator | IRGACURE ® 2959 | 0.50 |
| Colorant | Cyan pigment | 2.50 |
| Water | | Balance |

After each example and comparative ink composition was prepared, the decap was tested for each ink composition. Decap was performed on a testbed that included print cartridge electronics to print thermal inkjet pens with a nominal drop weight of 6 ng. These pens were printed on a standard office paper media loaded on a rotating drum (30 inches per second) with a pen frequency of 12 KHz and pen temp of 55° C. Pens were printed at discreet and increasing time intervals of up to 10 seconds. Between each print time interval, the pen was kept idle and uncapped. Decap is reported as # of spits (drops) required to attain a healthy (drop wt and location) normal drop on the medium. The molecular weight and decap results of each radiation curable polyurethane binder is also shown in Table 3.

TABLE 3

| Ink ID | PUD ID (from TABLE 1) | $MW_w$ (repeated from TABLE 1) | # spits to recover nozzle health |
|---|---|---|---|
| Example Ink 1 | 392 | 5,000 | 5.5 |
| Example Ink 2 | 379 | 4,500 | 5.8 |
| Example Ink 3 | 389 | 4,900 | 5.8 |
| Example Ink 4 | 380 | 4,400 | 6 |
| Example Ink 5 | 375 | 4,300 | 6.3 |
| Example Ink 6 | 377 | 4,500 | 6.3 |
| Example Ink 7 | 382 | 4,600 | 6.3 |
| Example Ink 8 | 390 | 4,400 | 6.7 |
| Example Ink 9 | 381 | 4,200 | 7.5 |
| Example Ink 10 | 396 | 4,200 | 8 |
| Example Ink 11 | 395 | 4,400 | 9 |
| Comparative Example Ink 12 | 369* | 19,000 | 42.5 |
| Comparative Example Ink 13 | 365* | 9,700 | 26.3 |
| Comparative Example Ink 14 | 364* | 8,100 | 25.3 |
| Comparative Example Ink 15 | 368* | 7,300 | 24.8 |
| Comparative Example Ink 16 | 371* | 11,000 | 22.8 |
| Comparative Example Ink 17 | 370* | 8,800 | 13.3 |

*Comparative Radiation Curable Polyurethane Binder Dispersion

The results shown in Table 3 clearly illustrate that the decap performance of the example ink compositions containing the radiation curable polyurethane binder dispersion with a weight average molecular weight of equal to or less than 5,000 is greatly improved when compared to the comparative ink compositions with the comparative radiation curable polyurethane binder dispersion. All of the comparative examples included polyurethane binder with a weight average molecular weight greater than 5,000.

It is believed that the NCO:OH ratio may also affect the decap performance. As illustrated in Table 3, each of the comparative example inks exhibited worse decap performance than the example inks. Each of the comparative example inks also included a PUD with an NCO:OH ratio of 1.8 or lower. In contrast, the example inks each included a PUD with an NCO:OH ratio greater than 1.8 (e.g., 2.6 or 2.8)

It is also believed that the ink compositions disclosed herein may enable the formation of a durable film. This is due, in part, to the crosslinking of the acrylate group(s) upon polymerization.

In general, during printing idle time, water evaporation from ink at the print head opening leads to significant viscosity increase close to the print head nozzles, which can form a viscous plug that prevents or interferes with the jetting of subsequent ink drops. The radiation curable polyurethane binder disclosed herein contributes to the ink having a lower viscosity build up. As such, the ink is prevented from becoming too viscous near the nozzles between the uncapped time intervals, thereby preventing clogging of the pen opening. As such, decap is improved and the print cartridge requires fewer drops to attain a normal, accurate drop on the medium.

It is to be understood that the ranges provided herein include the stated range and any value or sub-range within the stated range. For example, a range from about 5 wt % to about 10 wt % should be interpreted to include not only the explicitly recited limits of about 5 wt % to about 10 wt %, but also to include individual values, such as 6.5 wt %, 7.5 wt %, 8 wt %, 9 wt %, etc., and sub-ranges, such as from about 6 wt % to about 8 wt %, from about 5 wt % to about 7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent that the disclosed examples may be modified. Therefore, the foregoing description is to be considered non-limiting.

What is claimed is:

1. A radiation curable binder dispersion for an inkjet ink, the radiation curable binder dispersion comprising:
   water; and
   a radiation curable polyurethane dispersed in the water, the radiation curable polyurethane having a weight average molecular weight equal to or less than 5,000, having a glass transition temperature (Tg) less than 25° C., having a double bond density higher than 4.0, and having been formed from:
   a non-aromatic diisocyanate;
   a polyol;
   an acrylate or methacrylate, the acrylate or methacrylate having at least two hydroxyl functional groups and having an acrylate functional group or a methacrylate functional group;
   a compound including i) an ionic group or ii) a group to form an ionic group; and an other acrylate or methacrylate, the other acrylate or methacrylate having a hydroxyl functional group or an amino functional group;

wherein the radiation curable polyurethane has a ratio of isocyanate groups (NCO) to hydroxyl groups (OH) equal to or greater than 2.1, and wherein a total number of the hydroxyl groups in the ratio is based on hydroxyl groups of the polyol, the acrylate or methacrylate, and the compound including i) the ionic group or ii) the group to form an ionic group, and not on hydroxyl groups of the other acrylate or methacrylate.

2. The radiation curable binder dispersion as defined in claim 1 wherein the non-aromatic diisocyanate is selected from the group consisting of hexamethylene-1,6-diisocyanate, 2,2,4-trimethyl-hexamethylene-diisocyanate, and a combination thereof.

3. The radiation curable binder dispersion as defined in claim 2 wherein the radiation curable polyurethane excludes any other isocyanate.

4. The radiation curable binder dispersion as defined in claim 1 wherein the other acrylate or methacrylate having the hydroxyl functional group or the amino functional group is present in an amount ranging from about 10 wt % to about 65 wt % based on a total wt % of the radiation curable polyurethane.

5. The radiation curable binder dispersion as defined in claim 1 wherein:
the non-aromatic diisocyanate is present in an amount ranging from about 20 wt % to about 50 wt % based on a total wt % of the radiation curable polyurethane;
the polyol is present in an amount ranging from about 10 wt % to about 30 wt % based on the total wt % of the radiation curable polyurethane;
the acrylate or methacrylate having the at least two hydroxyl functional groups and having the acrylate functional group or the methacrylate functional group is present in an amount ranging from greater than 0 wt % to about 40 wt % based on the total wt % of the radiation curable polyurethane;
the compound including i) the ionic group or ii) the group to form the ionic group is present in an amount ranging from greater than 0 wt % to about 10 wt % based on the total wt % of the radiation curable polyurethane; and
the other acrylate or methacrylate having the hydroxyl functional group or the amino functional group is present in an amount ranging from about 10 wt % to about 65 wt % based on the total wt % of the radiation curable polyurethane.

6. The radiation curable binder dispersion as defined in claim 1 wherein the radiation curable polyurethane has an average particle size ranging from about 20 nm to about 200 nm, and has an acid number ranging from about 5 to about 25.

7. A radiation curable inkjet ink, comprising:
water;
a colorant;
a co-solvent;
a surfactant;
a photoinitiator;
an anti-kogation agent; and
a radiation curable polyurethane binder, the radiation curable polyurethane binder having a weight average molecular weight equal to or less than 5,000, having a glass transition temperature (Tg) less than 25° C., having a double bond density higher than 4.0, and having been formed from:

a non-aromatic diisocyanate;
a polyol;
an acrylate or methacrylate, the acrylate or methacrylate having at least two hydroxyl functional groups and having an acrylate functional group or a methacrylate functional group;
a compound including i) an ionic group or ii) a group to form an ionic group; and
an other acrylate or methacrylate, the other acrylate or methacrylate having a hydroxyl functional group or an amino functional group;
wherein the radiation curable polyurethane has a ratio of isocyanate groups (NCO) to hydroxyl groups (OH) equal to or greater than 2.1, and wherein a total number of the hydroxyl groups in the ratio is based on hydroxyl groups of the polyol, the acrylate or methacrylate, and the compound including i) the ionic group or ii) the group to form an ionic group, and not on hydroxyl groups of the other acrylate or methacrylate.

8. The radiation curable inkjet ink as defined in claim 7, further comprising a polymeric dispersant to disperse the colorant, and excluding a polymer other than the polymeric dispersant and the radiation curable polyurethane binder.

9. The radiation curable inkjet ink as defined in claim 7 wherein the non-aromatic diisocyanate is selected from the group consisting of hexamethylene-1,6-diisocyanate, 2,2,4-trimethyl-hexamethylene-diisocyanate, and a combination thereof, and wherein the radiation curable polyurethane binder excludes any other isocyanate.

10. The radiation curable inkjet ink as defined in claim 7 wherein the radiation curable polyurethane binder has an acid number ranging from about 10 to about 30.

11. The radiation curable inkjet ink as defined in claim 7 wherein the radiation curable polyurethane binder is present in an amount ranging from about 5 wt % to about 10 wt % of a total wt % of the inkjet ink.

12. The radiation curable inkjet ink as defined in claim 7 wherein:
the non-aromatic diisocyanate is present in an amount ranging from about 20 wt % to about 50 wt % based on a total wt % of the radiation curable polyurethane binder;
the polyol is present in an amount ranging from about 10 wt % to about 30 wt % based on the total wt % of the radiation curable polyurethane binder;
the acrylate or methacrylate having the at least two hydroxyl functional groups and having the acrylate functional group or the methacrylate functional group is present in an amount ranging from greater than 0 wt % to about 40 wt % based on the total wt % of the radiation curable polyurethane binder;
the compound including i) the ionic group or ii) the group to form the ionic group is present in an amount ranging from greater than 0 wt % to about 10 wt % based on the total wt % of the radiation curable polyurethane binder; and
the other acrylate or methacrylate having the hydroxyl functional group or the amino functional group is present in an amount ranging from about 10 wt % to about 65 wt % based on the total wt % of the radiation curable polyurethane binder.

13. The radiation curable inkjet ink as defined in claim 7 wherein the ratio of isocyanate groups (NCO) to hydroxyl groups (OH) ranges from about 2.6 to about 2.8.

14. The radiation curable binder dispersion as defined in claim 1 wherein the ratio of isocyanate groups (NCO) to hydroxyl groups (OH) ranges from about 2.6 to about 2.8.

15. The radiation curable binder dispersion as defined in claim 1 wherein the non-aromatic diisocyanate is 2,2,4-trimethyl-hexamethylene-diisocyanate.

16. The radiation curable binder dispersion as defined in claim 1 wherein the other acrylate or methacrylate has an amino functional group.

* * * * *

UNITED STATES PATENT AND TRADEMARK OFFICE
CERTIFICATE OF CORRECTION

PATENT NO. : 10,287,447 B2  
APPLICATION NO. : 15/518475  
DATED : May 14, 2019  
INVENTOR(S) : Tienteh Chen et al.

Page 1 of 1

It is certified that error appears in the above-identified patent and that said Letters Patent is hereby corrected as shown below:

On the Title Page

Item [73], delete "Hewiett-Packard" and insert -- Hewlett-Packard --, therefor.

Signed and Sealed this  
Seventeenth Day of September, 2019

Andrei Iancu  
*Director of the United States Patent and Trademark Office*